(12) United States Patent
Bewersdorf (10) Patent No.: US 6,552,795 B2
(45) Date of Patent: Apr. 22, 2003

(54) METHOD AND APPARATUS FOR ILLUMINATING A TRANSPARENT SPECIMEN

(75) Inventor: Joerg Bewersdorf, Heidelberg (DE)

(73) Assignee: Leica Microsystems Heidelberg GmbH, Mannheim (DE)

(*) Notice: Subject to any disclaimer, the term of this patent is extended or adjusted under 35 U.S.C. 154(b) by 12 days.

(21) Appl. No.: 09/794,982

(22) Filed: Feb. 27, 2001

(65) Prior Publication Data

US 2001/0019414 A1 Sep. 6, 2001

(30) Foreign Application Priority Data

Mar. 3, 2000 (DE) .......................... 100 10 154

(51) Int. Cl.[7] .............................................. G02B 21/00
(52) U.S. Cl. ...................................... 356/450; 356/360
(58) Field of Search ................................ 356/450, 360, 356/400; 359/900; 430/311, 313, 316; 250/201.9, 492.1, 548; 362/297; 716/19

(56) References Cited

U.S. PATENT DOCUMENTS 3,713,730 A * 1/1973 Kaplan .......................... 350/6
5,680,588 A * 10/1997 Gortych et al. ............. 395/500

FOREIGN PATENT DOCUMENTS

EP 0 491 289 B1 6/1992

* cited by examiner

Primary Examiner—Constantine Hannaher
Assistant Examiner—Otilia Gabor
(74) Attorney, Agent, or Firm—Simpson & Simpson, PLLC (57) ABSTRACT

A method and an apparatus for illuminating a transparent specimen (1), in particular for use in double confocal scanning microscopy, wherein for illumination of a point of the specimen (1), two light waves of a coherent light source (4) focused from opposite directions (2, 3) onto the point interfere to form an illumination pattern, and in order to eliminate the causes of the problems of the reconstruction method, at least two additional coherent light waves traveling toward one another are superimposed in order to minimize the secondary maxima (11, 12) of the illumination pattern.

19 Claims, 5 Drawing Sheets

METHOD AND APPARATUS FOR ILLUMINATING A TRANSPARENT SPECIMEN

CROSS-REFERENCE TO RELATED APPLICATIONS

This invention claims priority of a German patent application DE 100 101 54.2 filed Mar. 3, 2000 which is incorporated by reference herein.

FIELD OF THE INVENTION

The present invention concerns a method for illuminating a transparent specimen, in particular for use in double confocal scanning microscopy, wherein for illumination of a point of the specimen, two light waves of a coherent light source focused from opposite directions onto the point interfere to form an illumination pattern.

BACKGROUND OF THE INVENTION

Methods of the generic type are used in particular in double confocal scanning microscopes such as those known, for example, from EP 0 491 289 A1. In double confocal microscopy, light from a light source is divided into two partial beams, each partial beam being focused by way of an objective onto a common specimen point. The two objectives are arranged on different sides of the specimen plane that is common to them. In the specimen point and at the detection aperture stop, this interferometric illumination results in the formation of an interference pattern that, in the context of constructive interference, exhibits a principal maximum and several secondary maxima. The secondary maxima are generally arranged along the optical axis. Because of the interferometric illumination, it is possible with a double confocal scanning microscope to achieve greater axial resolution as compared to a conventional scanning microscope.

An image of a specimen recorded with a double confocal scanning microscope has principally one contribution that results from the principal maximum of the illumination pattern. Also superimposed on the image, however, are components that result from the illumination of the specimen with the secondary maxima of the illumination pattern. These disruptive image components can be subsequently removed from the recorded image with suitable reconstruction methods. Most often used in this context are inverse filtering methods which are implemented in the form of program modules on a computer. The reconstruction methods can only be applied successfully, however, if the intensity of the secondary maxima is much less than 50% of the intensity of the principal maximum of the illumination pattern. If this precondition is not met, either the noise component of the reconstructed image is too great, or the contributions of the secondary maxima cannot be completely removed from the image, so that "ghost structures" of the recorded specimen structure remain in the image. This can make unequivocal specimen analysis or image interpretation difficult or even impossible.

SUMMARY OF THE INVENTION

It is therefore the object of the present invention to eliminate the causes of the problems of the reconstruction method.

The object is achieved by a method comprising the steps:
illuminating of a point of the specimen with two light waves of a coherent light source defining a first electromagnetic field strength,
focussing the light waves from opposite directions onto the point,
interfering the light waves at the point to form an illumination pattern and
superimposing of at least two additional coherent light waves defining a second electromagnetic field strength traveling toward one another with the illumination pattern in order to minimize a secondary maxima of the illumination pattern.

It is advantageous that with appropriate superimposition, the electromagnetic field distribution that interferes in this fashion to form an overall illumination pattern exhibits reduced intensities in the secondary maxima of the original illumination pattern; ideally, the secondary maxima are in fact extinguished. The consequence of this is that the resulting image advantageously allows unequivocal specimen analysis, and ideally it is even possible to dispense with the use of reconstruction methods.

Because of fundamental properties of electromagnetic waves, a prerequisite for minimizing the secondary maxima of the illumination pattern is that the additional light waves be coherent with respect to the light waves that generate the original illumination pattern. Furthermore, the additional light waves must each travel toward one another, so that the additional light waves of themselves also create an interference pattern which can be superimposed on the original illumination pattern. Only if the additional light waves can themselves interfere does the additional illumination pattern exhibit an illumination structure that has a resolution level comparable to the original illumination pattern.

In a particularly advantageous embodiment, the phase relationship between the illumination pattern and the additional light waves is adjustable. In this context, the phase relationship between the original illumination pattern and all additional superimposed light waves could be adjusted. The additional illumination pattern generated by the additional superimposed light waves can accordingly be modified in its entirety relative to the original illumination pattern. In addition, only the phase relationship among the additional light waves themselves could be adjusted, the result being that only the additional illumination pattern superimposed on the original illumination pattern changes. This would make it possible to achieve an alternative change in the overall illumination pattern.

If the electromagnetic field strength at the location of a secondary maximum of the original illumination pattern is opposite to the electromagnetic field strength of the additionally superimposed illumination pattern, the resulting illumination intensity can advantageously be reduced. Ideally, an effort will be made to achieve this condition for all the secondary maxima of the original illumination pattern. The illumination patterns superimposed in this fashion have different signs and can thus be reduced and, ideally, extinguished.

In particularly advantageous fashion, the secondary maxima of the original illumination pattern can be extinguished if the electromagnetic field strength of the illumination pattern at the location of the secondary maxima corresponds in terms of magnitude to the electromagnetic field strength of the superimposed light waves, provided the electromagnetic field strength of the original illumination pattern and the electromagnetic field strength of the additionally superimposed illumination pattern have different signs at the location of the secondary maxima. A considerable reduction in the intensity of the secondary maxima is accordingly already possible if the electromagnetic field strength of the illumination pattern at the location of the secondary maxima corresponds approximately, in terms of magnitude, to the electromagnetic field strength of the superimposed light waves. The electromagnetic field strengths of the superimposed light waves can be adjusted by appropriately selecting the intensity of the additionally superimposed light waves. For this purpose, the intensity of the additional light waves is generally selected to be less than or greater than the intensity of the light waves that provide illumination. It can, however, be very particularly advantageous if the intensity of the additional light waves is selected to be identical to that of the light waves that provide illumination.

An essential distinction may be made among several variants for minimizing the secondary maxima of the original illumination pattern. Common to all the variants, however, is the fact that the original illumination of a point of the specimen is accomplished from two opposite directions, the coherent light beams used for the purpose being focused onto a common point.

The first variant provides for the additional coherent light waves traveling toward one another to proceed in collimated fashion in the specimen region.

The second variant provides for the additionally coherently superimposed light waves to be focused to a point in the specimen region.

The third variant provides for modulation over time of the intensity of the light for generating the original illumination pattern and/or of the intensity of the additionally superimposed light waves. It is conceivable, in this context, for the additionally superimposed light waves either to be collimated or to be focused onto one point in the specimen region.

In the first variant, the additionally coherently superimposed light waves proceed in collimated fashion in the specimen region, i.e. the light waves traveling toward one another have a parallel beam shape in the specimen region. The superimposition of these light waves results in an additional illumination pattern that can be superimposed on the original illumination pattern. This additional illumination pattern alternatingly exhibits maxima and minima that each lie in a plane which is perpendicular to the optical axis. The distance between two adjacent maxima of this additional illumination pattern can be adjusted by varying the intersection angle of two light beams traveling toward one another. In this context, the distance between two adjacent maxima is minimal when two light waves proceed exactly opposite to one another, i.e. when the intersection angle is 0 or 180 degrees.

By adjusting the intersection angle of two light waves proceeding in collimated fashion, an additional illumination pattern can be generated in such a way that at least one maximum of the additional illumination pattern can be at least largely superimposed on at least one secondary maximum of the original illumination pattern. Ideally, the electromagnetic field strength of the additional illumination patterns is selected in such a way that it has a different sign at the location of the secondary maxima of the original illumination pattern, and moreover are at least approximately equal in terms of magnitude. The secondary maxima of the original illumination pattern can thereby be extinguished.

In particularly advantageous fashion, the additional illumination pattern is configured in such a way that two adjacent maxima of the additional illumination pattern can be at least largely superimposed on the two secondary maxima of the original illumination pattern adjacent to the principal maximum. The additional illumination pattern thus exhibits a distance between two adjacent maxima which corresponds exactly to the distance between the two secondary maxima of the original illumination pattern adjacent to the principal maximum. It is thereby possible, in particularly advantageous fashion, to reduce or extinguish the two secondary maxima of the original illumination pattern which exhibit the greatest intensity and thus contribute the greatest interference.

The second variant is characterized by focusing of the additionally coherently superimposed light waves onto a common point in the specimen region. In this context, the two coherent light waves traveling toward one another are in each case focused onto a common point.

In particularly advantageous fashion, the original illumination pattern could be offset relative to the illumination pattern of the additionally superimposed light waves in such a way that only their secondary maxima are at least largely superimposed. That offset will generally be an axial offset, i.e. along the optical axis. Ideally, the first secondary maximum of the original illumination pattern could be superimposed on the first secondary maximum of the illumination pattern of the additionally superimposed light waves. The principal maximum of the original illumination pattern would accordingly be offset in the direction of the optical axis with respect to the principal maximum of the additional illumination pattern.

Alternatively to this, the two illumination patterns could also be offset in such a way that the principal maximum of the illumination pattern of the additionally superimposed light waves can be at least largely superimposed on a secondary maximum of the original illumination pattern. In this context, the principal maximum of the illumination pattern of the additionally superimposed light waves could be superimposed on a secondary maximum of the original illumination pattern adjacent to the principal maximum.

Ideally, there is provided for each secondary maximum of the original illumination pattern a respective additional illumination pattern that is respectively generated with the aid of additionally superimposed light waves. For this purpose as well, provision is made for the phase or electronic field strength at least at the location of the secondary maxima of the original illumination pattern adjacent to the principal maximum to be adjusted in such a way that these secondary maxima, above all, are minimized or extinguished.

The superimposition of the additional coherent light waves could be produced by modulation and/or filtration in at least one Fourier plane of the illumination beam path. The modulation and/or filtration could be accomplished with a phase plate and/or an amplitude plate. For example, a corresponding phase plate or amplitude plate could be arranged, for that purpose, in a Fourier plane in the common illumination beam path. The arrangement of two phase plates or amplitude plates each in a Fourier plane of the divided double confocal scanning microscope beam path would also be conceivable.

The phase plate or amplitude plate could act on only a part or portion of the illuminating beam; an effect on the entire illuminating beam would also be conceivable. A phase plate or amplitude plate of this kind could be embodied in the form of a $\lambda/4$ plate, a plate configured at least partially as a neutral density filter, or as a partially mirror-coated plate.

The third variant provides for the intensity of the light for generating the original illumination pattern, and/or the intensity of the additionally superimposed light waves, to be modulated over time. This variant is particularly advantageous for the detection of specimens that are marked with fluorescent markers. In particularly preferred fashion, the intensity of the light for generating the original illumination pattern and the intensity of the additionally superimposed light waves are modulated over time. The intensity modulations can moreover be offset from one another in time. To optimize the respective illumination conditions, the offset in time could be adjustable.

The intensity modulation could have a square-wave, sawtooth, triangular, or pulse shape. Alternatively, a light source that emits pulsed light could be used, thereby yielding an intensity modulation of the illuminating light.

Provision is made for synchronizing the intensity modulation of the light for generating the original illumination pattern, and/or the intensity modulation of the additionally superimposed light waves, with the detector system. For example, the detector could detect specimen light and forward it to the analysis system of the double confocal scanning microscope only during predefined time intervals or time intervals dependent on the intensity modulation over time.

All the variants could be used for the excitation of specimens marked with fluorescent markers. The fluorescence excitation could be accomplished with one-photon and/or multi-photon excitation. With one-photon excitation in particular, precautions must be taken to largely prevent premature bleaching of the fluorescent markers used, since they are impinged upon by more light during illumination of the overall illumination pattern. In particularly advantageous fashion, fluorescent nanocrystals could be used as the fluorescent markers, since they essentially do not bleach out.

It is a further object of the present invention to provide an apparatus which achieves a higher resolution.

The above object is accomplished by an apparatus for illuminating a transparent specimen comprising:

a coherent light source defining a beam of coherent light traveling along an illumination beam path, means for directing the beam of coherent light to a point of the specimen, means for focussing the coherent light waves from opposite directions onto the point of the specimen, such that two light waves of a coherent light beam defining a first electromagnetic field strength, interfere at the point forming an illumination pattern and an optical unit for generating at least two additional coherent light waves defining a second electromagnetic field strength traveling toward one another and superimposing with the illumination pattern in order to minimize a secondary maxima (11, 12) of the illumination pattern.

In a concrete embodiment, the optical unit is configured as a reflection plate. It could be a glass plate of parallelepipedal configuration whose surface is oriented perpendicular to the optical axis. The light coming from the light source passes through the reflection plate; a portion thereof is reflected twice by internal reflection before that portion of the light leaves the reflection plate. The multiply reflected portions of the light are superimposed, as additional coherent light waves, on the transmitted portion of the light.

In particularly advantageous fashion, the reflection plate has two wedge-shaped optical components placed together. These two components could be shifted with respect to one another transversely to the optical axis, so that the thickness of the resulting plate can thereby be adjusted. If the wedge angle of the two components is small, i.e. if the one surface of the component has a very slight inclination with respect to the other surface of the component, the thickness of the resulting plate can be varied very sensitively. The two optical components could be equipped, between the sides facing one another, with an optical medium, for example immersion oil having an appropriate refractive index.

The thickness of the reflection plate is to be dimensioned as a function of the necessary axial offset of the original illumination pattern with respect to the additionally superimposed illumination patterns. If conventional microscope objectives for double confocal scanning microscopy are used, the axial offset δz is correlated with the thickness Z of the reflection plate and the magnification M of the microscope objectives as follows:

$$Z=0.5*M^2*\delta z$$

The optical unit has a corresponding coating to establish the necessary intensity ratio for the individual light waves. The transmission or reflection capability of the optically effective surfaces of the reflection plate can be adjusted by way of the coating. Ideally, the multiply reflected light has an intensity ratio, as compared to the directly transmitted light, such that the electromagnetic field strength of the illumination pattern at the location of the secondary maxima corresponds in terms of magnitude at least approximately to the electromagnetic field strength of the superimposed light waves.

In an alternative embodiment, the optical unit could have beam splitter plates and mirrors. The beam splitter plates of the optical unit have a coating which creates the necessary intensity ratio for the individual light waves. The necessary intensity ratio of the original light waves with respect to the superimposed light waves can ultimately be established by appropriate coating of the beam splitter plates. The coating of the beam splitter plates which characterizes the transmission or reflection capability could be of individually different configuration for each beam splitter plate of the optical unit.

In particularly advantageous fashion, an offset in time of the intensity-modulated light waves can be established by corresponding positioning of individual components of the optical unit. In the case of a pulsed light wave in particular, the offset in time between the light beam that passes through without reflection and the light beam that is reflected once or many times can be correspondingly established by way of the additional optical path of the optical unit.

The entire optical unit could be arranged displaceably in the lateral and/or axial direction relative to the illumination beam path. By modifying the position of the optical unit, the additional illumination pattern can be offset laterally and/or axially with respect to the original illumination pattern. In addition, individual components of the optical unit could also be laterally and/or axially shifted. As a result, first of all the additional illumination pattern can be varied in terms of its three-dimensional structure, and the offset in time of intensity-modulated light waves could be adjusted by way of a transit time difference.

It is therefore the object of the present invention to eliminate the causes of the problems of the reconstruction method.

What has been recognized according to the present invention is firstly that the results of the image reconstruction method can be improved in particular if the intensity of the secondary maxima of the illumination pattern can be decreased. According to the present invention, in order to decrease the intensity of the secondary maxima, additional coherent light waves traveling toward one another are superimposed on the original double confocal scanning-microscopy illumination pattern, so that the original illumination pattern interferes with the additional illumination pattern. With appropriate superimposition, the electromagnetic field distribution that interferes in this fashion to form an overall illumination pattern exhibits reduced intensities in the secondary maxima of the original illumination pattern; ideally, the secondary maxima are in fact extinguished. The consequence of this is that the resulting image advantageously allows unequivocal specimen analysis, and ideally it is even possible to dispense with the use of reconstruction methods.

Because of fundamental properties of electromagnetic waves, a prerequisite for minimizing the secondary maxima of the illumination pattern is that the additional light waves be coherent with respect to the light waves that generate the original illumination pattern. Furthermore, the additional light waves must each travel toward one another, so that the additional light waves of themselves also create an interference pattern which can be superimposed on the original illumination pattern. Only if the additional light waves can themselves interfere does the additional illumination pattern exhibit an illumination structure that has a resolution level comparable to the original illumination pattern.

In a particularly advantageous embodiment, the phase relationship between the illumination pattern and the additional light waves is adjustable. In this context, the phase relationship between the original illumination pattern and all additional superimposed light waves could be adjusted. The additional illumination pattern generated by the additional superimposed light waves can accordingly be modified in its entirety relative to the original illumination pattern. In addition, only the phase relationship among the additional light waves themselves could be adjusted, the result being that only the additional illumination pattern superimposed on the original illumination pattern changes. This would make it possible to achieve an alternative change in the overall illumination pattern.

If the electromagnetic field strength at the location of a secondary maximum of the original illumination pattern is opposite to the electromagnetic field strength of the additionally superimposed illumination pattern, the resulting illumination intensity can advantageously be reduced. Ideally, an effort will be made to achieve this condition for all the secondary maxima of the original illumination pattern. The illumination patterns superimposed in this fashion have different signs and can thus be reduced and, ideally, extinguished.

In particularly advantageous fashion, the secondary maxima of the original illumination pattern can be extinguished if the electromagnetic field strength of the illumination pattern at the location of the secondary maxima corresponds in terms of magnitude to the electromagnetic field strength of the superimposed light waves, provided the electromagnetic field strength of the original illumination pattern and the electromagnetic field strength of the additionally superimposed illumination pattern have different signs at the location of the secondary maxima. A considerable reduction in the intensity of the secondary maxima is accordingly already possible if the electromagnetic field strength of the illumination pattern at the location of the secondary maxima corresponds approximately, in terms of magnitude, to the electromagnetic field strength of the superimposed light waves. The electromagnetic field strengths of the superimposed light waves can be adjusted by appropriately selecting the intensity of the additionally superimposed light waves. For this purpose, the intensity of the additional light waves is generally selected to be less than or greater than the intensity of the light waves that provide illumination. It can, however, be very particularly advantageous if the intensity of the additional light waves is selected to be identical to that of the light waves that provide illumination.

An essential distinction may be made among several variants for minimizing the secondary maxima of the original illumination pattern. Common to all the variants, however, is the fact that the original illumination of a point of the specimen is accomplished from two opposite directions, the coherent light beams used for the purpose being focused onto a common point.

The first variant provides for the additional coherent light waves traveling toward one another to proceed in collimated fashion in the specimen region.

The second variant provides for the additionally coherently superimposed light waves to be focused to a point in the specimen region.

The third variant provides for modulation over time of the intensity of the light for generating the original illumination pattern and/or of the intensity of the additionally superimposed light waves. It is conceivable, in this context, for the additionally superimposed light waves either to be collimated or to be focused onto one point in the specimen region.

In the first variant, the additionally coherently superimposed light waves proceed in collimated fashion in the specimen region, i.e. the light waves traveling toward one another have a parallel beam shape in the specimen region. The superimposition of these light waves results in an additional illumination pattern that can be superimposed on the original illumination pattern. This additional illumination pattern alternatingly exhibits maxima and minima that each lie in a plane which is perpendicular to the optical axis. The distance between two adjacent maxima of this additional illumination pattern can be adjusted by varying the intersection angle of two light beams traveling toward one another. In this context, the distance between two adjacent maxima is minimal when two light waves proceed exactly opposite to one another, i.e. when the intersection angle is 0 or 180 degrees.

By adjusting the intersection angle of two light waves proceeding in collimated fashion, an additional illumination pattern can be generated in such a way that at least one maximum of the additional illumination pattern can be at least largely superimposed on at least one secondary maximum of the original illumination pattern. Ideally, the electromagnetic field strength of the additional illumination patterns is selected in such a way that it has a different sign at the location of the secondary maxima of the original illumination pattern, and moreover are at least approximately equal in terms of magnitude. The secondary maxima of the original illumination pattern can thereby be extinguished.

In particularly advantageous fashion, the additional illumination pattern is configured in such a way that two adjacent maxima of the additional illumination pattern can be at least largely superimposed on the two secondary maxima of the original illumination pattern adjacent to the principal maximum. The additional illumination pattern thus exhibits a distance between two adjacent maxima which corresponds exactly to the distance between the two secondary maxima of the original illumination pattern adjacent to the principal maximum. It is thereby possible, in particularly advantageous fashion, to reduce or extinguish the two secondary maxima of the original illumination pattern which exhibit the greatest intensity and thus contribute the greatest interference.

The second variant is characterized by focusing of the additionally coherently superimposed light waves onto a common point in the specimen region. In this context, the two coherent light waves traveling toward one another are in each case focused onto a common point.

In particularly advantageous fashion, the original illumination pattern could be offset relative to the illumination pattern of the additionally superimposed light waves in such a way that only their secondary maxima are at least largely superimposed. That offset will generally be an axial offset, i.e. along the optical axis. Ideally, the first secondary maximum of the original illumination pattern could be superimposed on the first secondary maximum of the illumination pattern of the additionally superimposed light waves. The principal maximum of the original illumination pattern would accordingly be offset in the direction of the optical axis with respect to the principal maximum of the additional illumination pattern.

Alternatively to this, the two illumination patterns could also be offset in such a way that the principal maximum of the illumination pattern of the additionally superimposed light waves can be at least largely superimposed on a secondary maximum of the original illumination pattern. In this context, the principal maximum of the illumination pattern of the additionally superimposed light waves could be superimposed on a secondary maximum of the original illumination pattern adjacent to the principal maximum.

Ideally, there is provided for each secondary maximum of the original illumination pattern a respective additional illumination pattern that is respectively generated with the aid of additionally superimposed light waves. For this purpose as well, provision is made for the phase or electronic field strength at least at the location of the secondary maxima of the original illumination pattern adjacent to the principal maximum to be adjusted in such a way that these secondary maxima, above all, are minimized or extinguished.

The superimposition of the additional coherent light waves could be produced by modulation and/or filtration in at least one Fourier plane of the illumination beam path. The modulation and/or filtration could be accomplished with a phase plate and/or an amplitude plate. For example, a corresponding phase plate or amplitude plate could be arranged, for that purpose, in a Fourier plane in the common illumination beam path. The arrangement of two phase plates or amplitude plates each in a Fourier plane of the divided double confocal scanning microscope beam path would also be conceivable.

The phase plate or amplitude plate could act on only a part or portion of the illuminating beam; an effect on the entire illuminating beam would also be conceivable. A phase plate or amplitude plate of this kind could be embodied in the form of a $\lambda/4$ plate, a plate configured at least partially as a neutral density filter, or as a partially mirror-coated plate.

The third variant provides for the intensity of the light for generating the original illumination pattern, and/or the intensity of the additionally superimposed light waves, to be modulated over time. This variant is particularly advantageous for the detection of specimens that are marked with fluorescent markers. In particularly preferred fashion, the intensity of the light for generating the original illumination pattern and the intensity of the additionally superimposed light waves are modulated over time. The intensity modulations can moreover be offset from one another in time. To optimize the respective illumination conditions, the offset in time could be adjustable.

The intensity modulation could have a square-wave, sawtooth, triangular, or pulse shape. Alternatively, a light source that emits pulsed light could be used, thereby yielding an intensity modulation of the illuminating light.

Provision is made for synchronizing the intensity modulation of the light for generating the original illumination pattern, and/or the intensity modulation of the additionally superimposed light waves, with the detector system. For example, the detector could detect specimen light and forward it to the analysis system of the double confocal scanning microscope only during predefined time intervals or time intervals dependent on the intensity modulation over time.

All the variants could be used for the excitation of specimens marked with fluorescent markers. The fluorescence excitation could be accomplished with one-photon and/or multi-photon excitation. With one-photon excitation in particular, precautions must be taken to largely prevent premature bleaching of the fluorescent markers used, since they are impinged upon by more light during illumination of the overall illumination pattern. In particularly advantageous fashion, fluorescent nanocrystals could be used as the fluorescent markers, since they essentially do not bleach out.

BRIEF DESCRIPTION OF THE DRAWINGS

There are various ways of advantageously embodying and developing the teaching of the present invention. Reference is made, for that purpose, on the one hand to the claims which follow claims 1 and 23, and on the other hand to the explanation below of preferred exemplary embodiments of the invention with reference to the drawings. In conjunction with the explanation of the preferred exemplary embodiments of the invention with reference to the drawings, an explanation is also given of generally preferred embodiments and developments of the teaching. In the drawings:

DETAILED DESCRIPTION OF THE INVENTION

Figure 1:
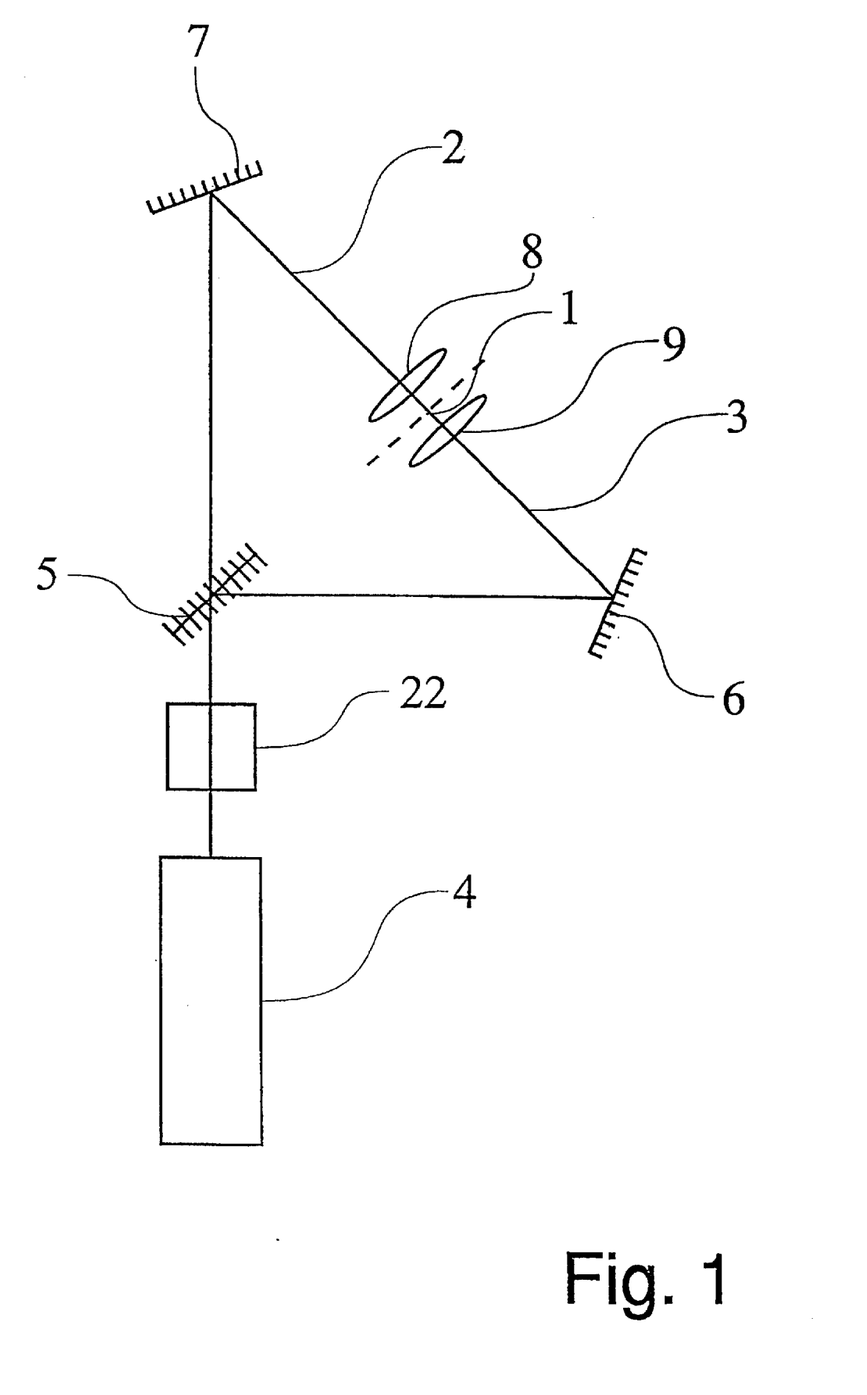
FIG. 1 shows, in a schematic depiction, a beam path of a double confocal scanning microscope.

FIG. 1 shows an apparatus for carrying out a method for illuminating a transparent specimen 1 with a double confocal scanning microscope, in which for illumination of a point of specimen 1, two light waves of a coherent light source 4, focused onto the point from opposite directions 2, 3, interfere to produce an illumination pattern. The two light waves are split by way of a beam splitter 5 into two partial beams, each of which is reflected by a mirror 6, 7 in such a way that they pass through respective objectives 8, 9 from different directions. Objectives 8, 9 focus the two split light waves onto a common point. The illumination pattern of the double confocal scanning microscope forms at that common point, and thus illuminates a transparent specimen introduced between the two objectives 8, 9.

In order to explain, by way of example, the second variant of the method according to the present invention, reference will be made below to FIGS. 2A through 2D. In the diagrams shown therein, the local coordinate in the direction of the optical axis is plotted on the abscissa, and the electromagnetic field strength is plotted on the ordinate. The abscissas of the diagrams shown in FIGS. 2A through 2D are to the same scale and extend over the same region, which is divided into units of the wavelength of the illuminating light.

Figure 2A:
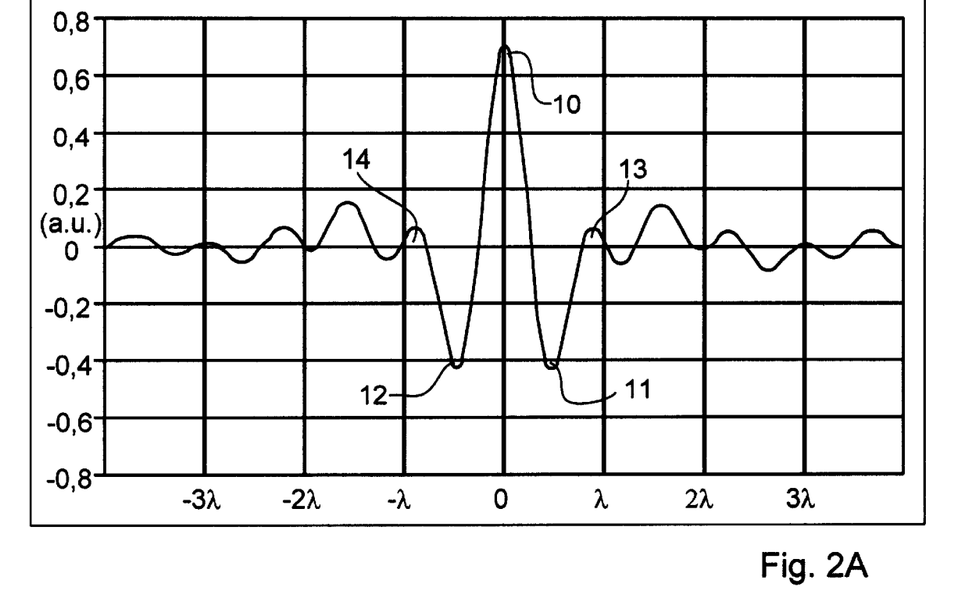
FIG. 2A shows, in a diagram, the electromagnetic field strength of the original illumination pattern as a function of the optical axis.

FIG. 2A shows the electromagnetic field strength of a typical illumination pattern in double confocal scanning microscopy at the lateral coordinates of the focus point along the optical axis. The illumination pattern is configured symmetrically with respect to the focal plane. In this diagram, the focal plane has an abscissa coordinate of 0. Principal maximum 10 of the illumination pattern also has an abscissa coordinate of 0. The closest secondary maxima 11, 12 are arranged approximately one half wavelength away from the principal maximum; in the diagram shown in FIG. 2A, the electromagnetic field strength at the location of the two secondary maxima 11, 12 has a negative value. Secondary maxima 13, 14 are approximately one wavelength away from the focal plane. The intensity distribution of the illumination pattern of the electromagnetic field strength shown in FIG. 2A is obtained by squaring the absolute value of this curve shape.

Figure 2B:
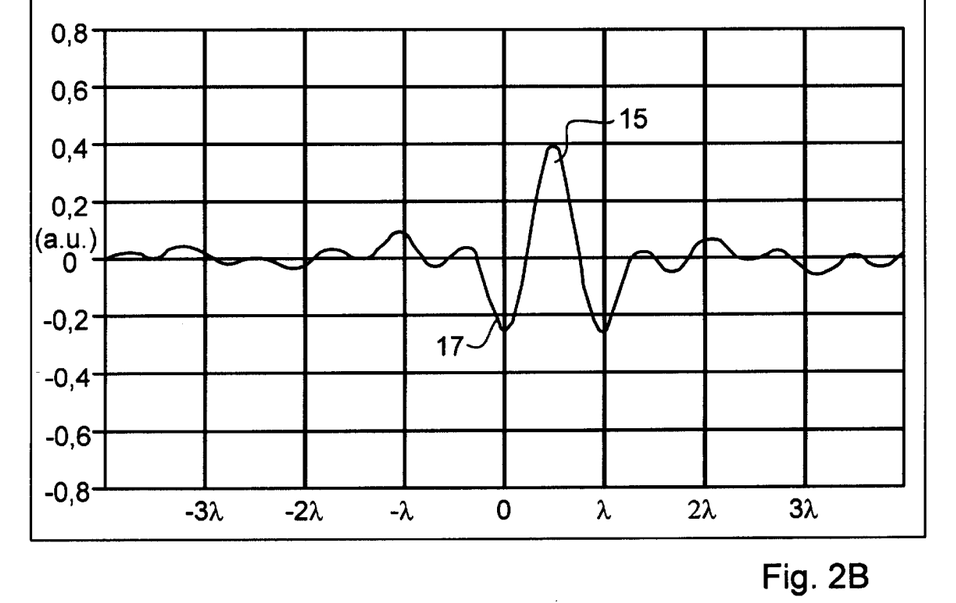
FIG. 2B shows, in a diagram, the electromagnetic field strength of a first additional illumination pattern as a function of the optical axis.

According to the present invention, an additional illumination pattern is superimposed on the illumination pattern shown in FIG. 2A. This additional illumination pattern is generated from two additional coherent light waves traveling toward one another. The electromagnetic field distribution of the additional illumination pattern is shown in FIG. 2B. The phase relationship between the original illumination pattern and the additional illumination pattern (or its light waves) was established in such a way that the electromagnetic field strengths of the illumination patterns are oppositely configured. Concretely, the electromagnetic field strength at the location of secondary maximum 11 has a value (evident from FIG. 2A) of approximately −0.4. Principal maximum 15 of the additional illumination pattern, on the other hand, has an electromagnetic field strength at the location of secondary maximum 11 that corresponds to a value (evident from FIG. 2B) of approximately 0.4. The electromagnetic field strengths of the superimposed illumination patterns at the location of secondary maximum 11 are thus at least approximately equal in terms of magnitude.

The additional illumination pattern shown in FIG. 2B is offset relative to the original illumination pattern shown in FIG. 2A in such a way that principal maximum 15 of the additional illumination pattern is superimposed on secondary maximum 11 of the original illumination pattern. Secondary maximum 17 of the additional illumination pattern has an abscissa coordinate of 0.

Figure 2C:
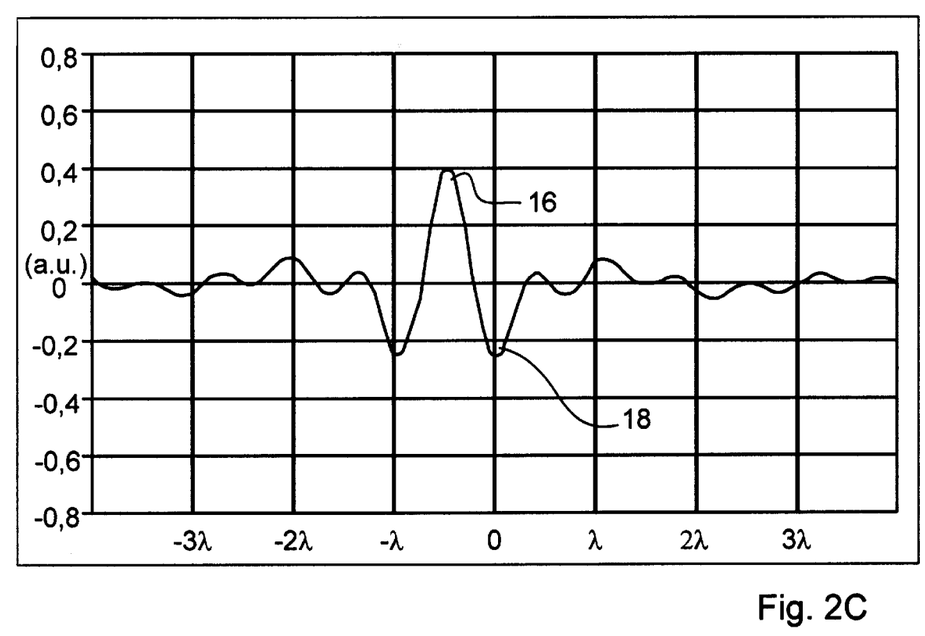
FIG. 2C shows, in a diagram, the electromagnetic field strength of a further additional superimposed illumination pattern as a function of the optical axis.

FIG. 2C shows a further illumination pattern that is superimposed on the two illumination patterns shown in FIGS. 2A and 2B. The illumination pattern of FIG. 2C has a principal maximum 16 that is arranged at the location of secondary maximum 12 of the original illumination pattern. Secondary maximum 18 of the additional illumination pattern also has an abscissa coordinate of 0. One additional illumination pattern is therefore generated, by way of additionally superimposed light waves, for each of the two secondary maxima 11, 12 of the original illumination pattern.

Figure 2D:
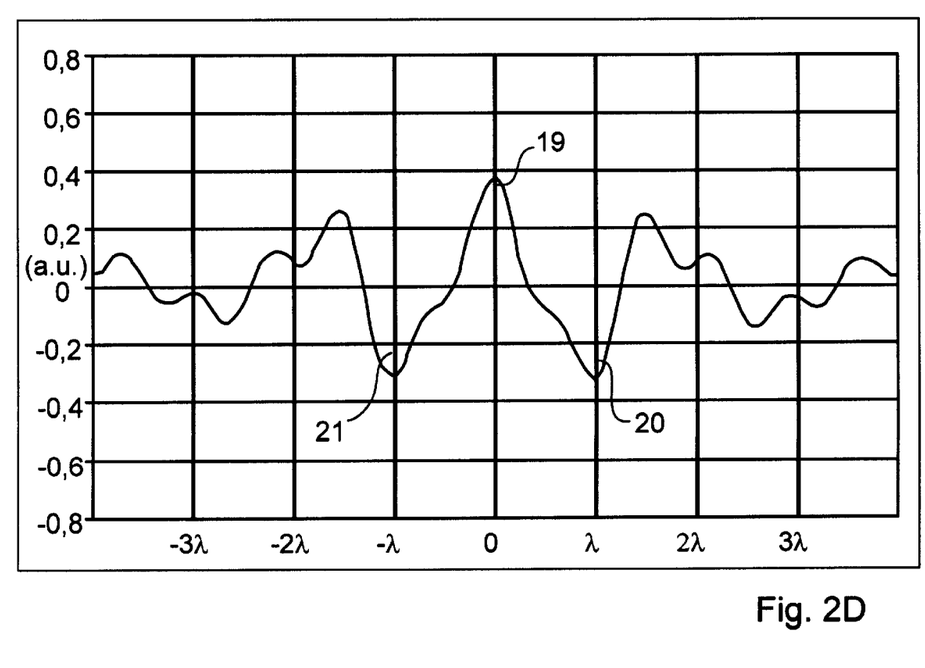
FIG. 2D shows, in a diagram, the resulting electromagnetic field distribution as a function of the optical axis.

FIG. 2D depicts the electromagnetic field strength of the three superimposed illumination patterns. The resulting illumination pattern has a principal maximum 19 at the location of the focal plane. Two further maxima 20, 21 are adjacent to principal maximum 19. Further maxima 20, 21 are farther away from the focal plane, however, i.e. approximately one wavelength of the light used. But because only the region approximately +/−λ/2 about the focal plane in the axial direction is detected with a double confocal scanning microscope, the contributions of additional maxima 20, 21 can be blanked out by the detection pinhole. Principal maximum 19 of the resulting illumination pattern has approximately the same width as principal maximum 10 of the original illumination pattern. This variant accordingly offers an axial resolution that would not be achievable in this fashion without disruptive contributions from secondary maxima 11, 12.

Figure 3:
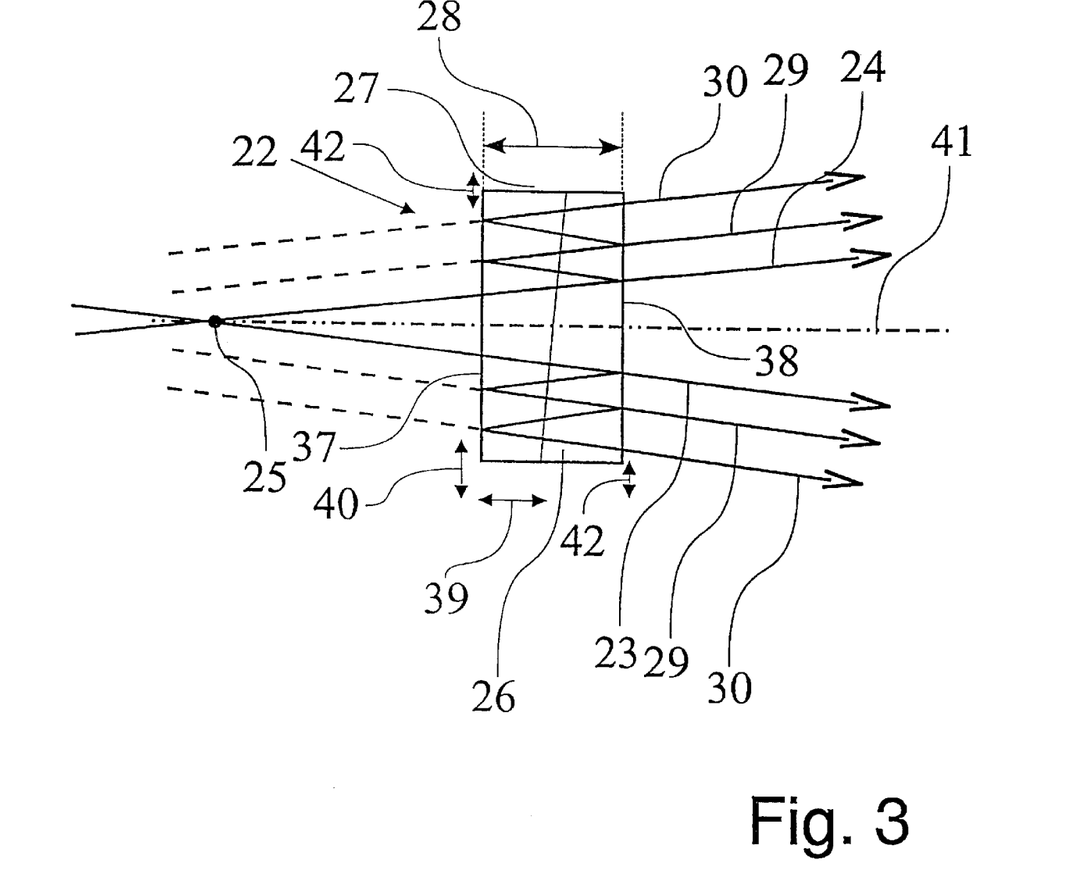
FIG. 3 shows a schematic depiction of an optical unit configured as a reflection plate.

With regard to an embodiment in terms of apparatus, the additional coherent light beams traveling toward one another are generated by way of an optical unit 22 shown in FIG. 1. FIG. 3 shows a first exemplary embodiment of an optical unit 22 which generates the additional coherent light waves by beam division of the light emitted from light source 4. In this context, beam division is produced with optical unit 22 using a combination of transmission and multiple reflection. Higher-order multiple reflections can be avoided by appropriate dimensioning of the components or the arrangement of stops. Optical unit 22 is arranged in the divergently proceeding illuminating beam path. FIG. 3 indicates that the original light beams 23, 24 diverge from focal point 25. The two light beams 23, 24 show the outer or enveloping beams of the light emitted from the light source. Optical unit 22 is configured as a reflection plate comprising two wedge-shaped optical components 26, 27 placed together. Introduced between the two wedge-shaped reflection plates 26, 27 is an immersion oil which has a refractive index corresponding to that of the two reflection plates 26, 27. Optical components 26, 27 are arranged displaceably with respect to one another, so that the effective thickness 28 of the reflection plate is adjustable. Additional light waves 29, 30 are generated by internal reflection in the assembled reflection plate.

Figure 4:
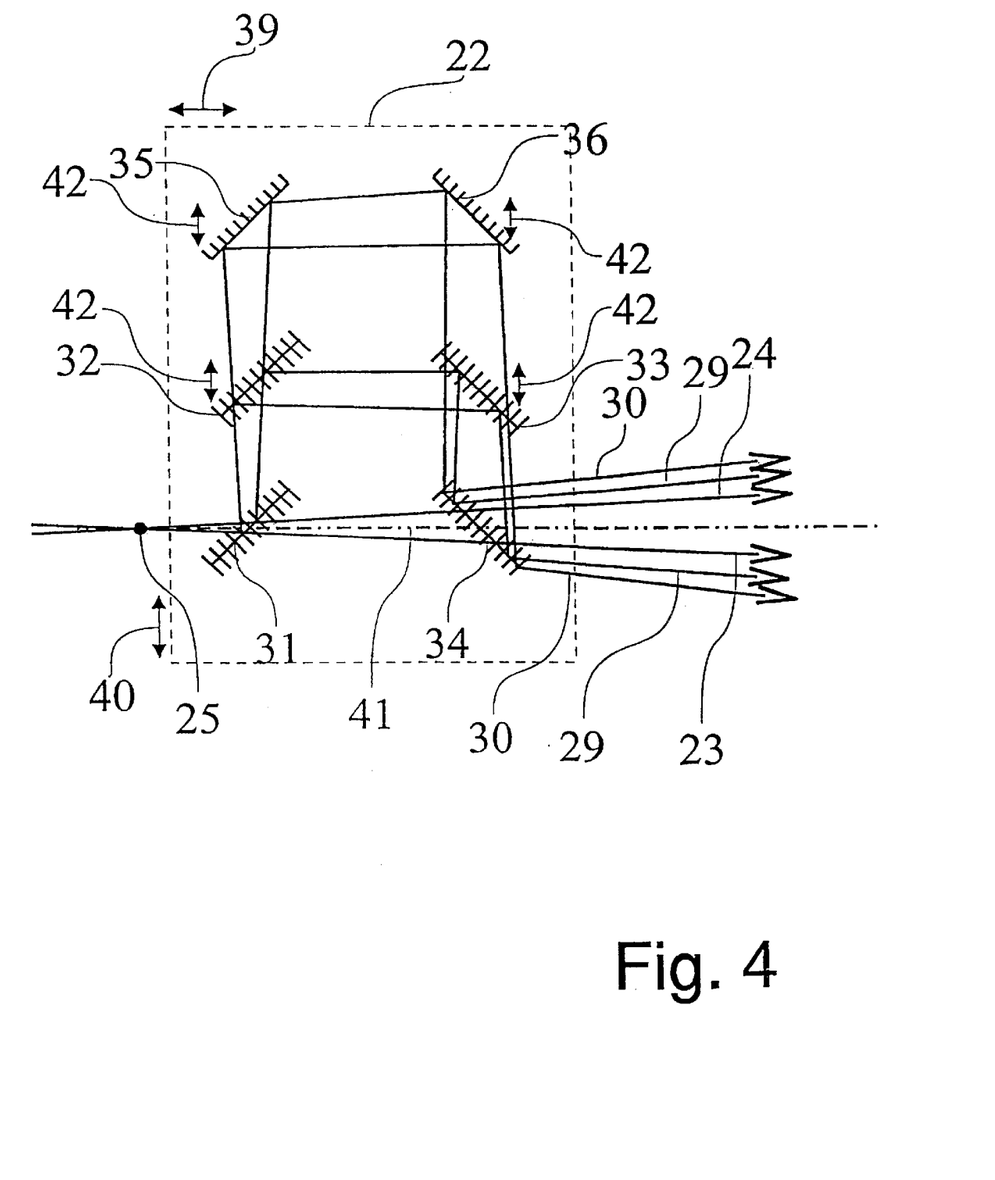
FIG. 4 shows, in a schematic depiction, an optical unit configured from beam splitters and mirrors.

FIG. 4 shows an alternative embodiment of an optical unit 22 comprising beam splitters 31, 32, 33, 34 and mirrors 35, 36. This optical arrangement is also arranged in the divergently proceeding beam path. One portion of light beams 23, 24 proceeding divergently from the focal point 25 is reflected from first beam splitter 31, and another portion passes through it. The reflected portion strikes beam splitter 32, which in turns allows portions of the light beams to be reflected and transmitted. The transmitted portion is in turn reflected from mirrors 35 and 36. Beam splitter 33 combines two light beams, namely the reflected portion of beam splitter 32, and the light beam coming from mirror 36. The combined light beams are superimposed, by way of beam splitter 34, on the transmitted portion of beam splitter 31.

Beam splitters 31, 32, 33, 34 have a coating that generates the necessary intensity ratio for the light beams to be superimposed. The same is true of the two surfaces 37, 38 of the assembled reflection plate 26, 27 of FIG. 3.

The optical units of FIGS. 3 and 4 can be shifted in their entirety along directions 39 and 40 relative to the illumination beam path or optical axis 41. Shifting the entire optical unit 22 along direction 39 makes it possible to modify the axial offset of the additionally superimposed illumination patterns.

The two wedge-shaped components 26, 27 of the reflection plate shown in FIG. 3 are arranged displaceably with respect to one another along direction 42. The parts of optical unit 22 of FIG. 4 can also be shifted along direction 42. Provision is made, in this context, for either the two mirrors 35, 36 or the two beam splitter plates 32, 33 to be shifted in paired fashion along direction 42. This makes it possible, in particularly advantageous fashion, to adjust the transit time difference of the additionally superimposed light waves appropriately in the context of the third variant.

PARTS LIST

1 Specimen
2 Partial beam from one direction
3 Partial beam from opposite direction
4 Light wave
5 Beam splitter
6 Mirror
7 Mirror
8 Objective
9 Objective
10 Principal maximum of original illumination pattern
11 First secondary maximum of (10)
12 First secondary maximum of (10)
13 Second secondary maximum of (10)
14 Second secondary maximum of (10)
15 Principal maximum of additional illumination pattern
16 Principal maximum of second additional illumination pattern
17 Secondary maximum of (15)
18 Secondary maximum of (17)
19 Principal maximum of resulting illumination pattern
20 Secondary maximum of (19)
21 Secondary maximum of (19)
22 Optical unit
23 Original light beams
24 Original light beams
25 Focal point
26 Wedge-shaped reflection plates
27 Wedge-shaped reflection plates
28 Thickness of (26, 27)
29 Additional light waves
30 Additional light waves
31 Beam splitter of (22)
32 Beam splitter of (22)
33 Beam splitter of (22)
34 Beam splitter of (22)
35 Mirror of (22)
36 Mirror of (22)
37 Surface of (26, 27)
38 Surface of (26, 27)
39 Movement directions of (22)
40 Movement directions of (22)
41 Optical axis
42 Displacement direction of (26, 27)

What is claimed is:

1. A method for illuminating a transparent specimen (1) comprising the steps of:
    illuminating of a point of the specimen (1) with two light waves of a coherent light source (4) defining a first electromagnetic field strength;
    focusing the light waves from opposite directions (2, 3) onto the point;
    interfering the light waves at the point to form a first, original illumination pattern; and,
    superimposing a second illumination pattern, comprising at least two additional coherent light waves defining a second electromagnetic field strength traveling toward one another with the original illumination pattern in order to minimize a secondary maxima (11, 12) of the original illumination pattern.

2. The method as defined in claim 1, comprising the additional step of adjusting a phase relationship between the illumination pattern and the additional light waves.

3. The method as defined in claim 1, wherein the first electromagnetic field strength and the second electromagnetic field strength are opposite at the location of the secondary maxima (11, 12) of the original illumination pattern.

4. The method as defined in claim 1, wherein the first electromagnetic field strength of the illumination pattern at the location of the secondary maxima (11, 12) corresponds at least approximately in terms of magnitude to the second electromagnetic field strength of the superimposed light waves.

5. The method as defined in claim 1, wherein the additionally superimposed illumination pattern is generated in such a way that at least one maximum of the superimposed illumination pattern can be at least largely superimposed on at least one secondary maximum of the original illumination pattern.

6. The method as defined in claim 1, wherein for each secondary maximum (11, 12) of the original illumination pattern, a respective additional illumination pattern is generated with the aid of additionally superimposed light waves.

7. The method as defined in claim 1, wherein the superimposition of the additional coherent light waves is produced by modulation and/or filtration in at least one Fourier plane of the illumination beam path.

8. The method as defined in claim 1, wherein the intensity of the light for generating the original illumination pattern, and/or the intensity of the additionally superimposed light waves, is modulated over time.

9. The method as defined in claim 8, wherein the intensity modulation of the light for generating the original illumination pattern is offset in time with respect to the intensity modulation of the additionally superimposed light waves.

10. The method as defined in claim 9, wherein the offset in time is adjustable.

11. The method as defined in claim 8, wherein a light source that emits pulsed light is used.

12. An apparatus for illuminating a transparent specimen (1) comprising:
    a coherent light source (4) defining a beam of coherent light traveling along an illumination beam path,
    means for directing the beam of coherent light to a point of the specimen (1),
    means for focussing the coherent light waves from opposite directions (2, 3) onto the point of the specimen (1), such that two light waves of a coherent light beam defining a first electromagnetic field strength, interfere at the point forming an illumination pattern and
    an optical unit for generating at least two additional coherent light waves defining a second electromagnetic field strength traveling toward one another and superimposing with the illumination pattern in order to minimize a secondary maxima (11, 12) of the illumination pattern.

13. The apparatus as defined in claim 12, characterized in that the additional coherent light waves are generated by beam division of the light emitted by the light source with an optical unit (22).

14. The apparatus as defined in claim 13, characterized in that the optical unit (22) produces the beam division by a combination of transmission and multiple reflection.

15. The apparatus as defined in claim 13, characterized in that the optical unit is arranged in a diverged section of the illumination beam path.

16. The apparatus as defined in claim 13, characterized in that the optical unit has a first and second wedge-shaped optical component (26, 27) together defining an effective thickness and the components are shiftable with respect to one another so that the effective thickness (28) of the optical unit is adjustable.

17. The apparatus as defined in claim 13, characterized in that the optical unit (22) has beam splitter plates (31, 32, 33, 34) and mirrors (35, 36).

18. The apparatus as defined in claim 17, characterized in that the mirrors (35, 36) of the optical unit (22) are moveably mounted to establish an offset in time of intensity-modulated light waves.

19. The apparatus as defined in claim 13, characterized in that the optical unit is movable in a direction laterally (40) and/or axially (39) relative to the illumination beam path.

* * * * *